United States Patent [19]
Oldendorf

[11] Patent Number: 5,186,590
[45] Date of Patent: Feb. 16, 1993

[54] MULTIPART DOWEL

[76] Inventor: Günter Oldendorf, Buchfeldstrasse 41, 7085 Bopfingen, Fed. Rep. of Germany

[21] Appl. No.: 768,282
[22] PCT Filed: Mar. 16, 1990
[86] PCT No.: PCT/EP90/00435
    § 371 Date: Oct. 1, 1991
    § 102(e) Date: Oct. 1, 1991
[87] PCT Pub. No.: WO90/12214
    PCT Pub. Date: Oct. 18, 1990

[30] Foreign Application Priority Data
    Apr. 3, 1989 [DE] Fed. Rep. of Germany ....... 3910702

[51] Int. Cl.⁵ ............................ F16B 13/06; F24F 7/00
[52] U.S. Cl. ........................................ 411/45; 411/51;
                                                411/908; 454/271
[58] Field of Search ............... 411/41, 42, 44, 45,
                              411/51, 908, 339; 454/270, 271, 276

[56] References Cited
    U.S. PATENT DOCUMENTS
    3,393,599  7/1968  Fisher ................................ 411/41
    4,085,651  4/1978  Koscik ............................... 411/41
    4,391,559  7/1983  Mizusawa ........................... 411/41
    4,856,950  8/1989  Bushnell ............................ 411/51
    4,878,791 11/1989  Kurihara et al. .................. 411/41

Primary Examiner—Neill R. Wilson
Attorney, Agent, or Firm—Kane, Dalsimer, Sullivan, Kurucz, Levy, Eisele and Richard

[57] ABSTRACT

The invention concerns a multi-part dowel with an outer body (2), which has an approximately cylindrical shank (4) and an innter body (12). In the position of use, the outer body (2) and inner body (12) engage with each other in the same way as a multiple screw-thread. The outer body (2) has, in its solid shaft (4), helical grooves (8) which are positioned to form a star when viewed in cross-section and which form an internal screw-thread. The inner body (12) has matching helical ribs (14) also positioned to form a star. The pitch of the thread is greater than the length of the thread. In what is the front section of the outer body (2) when the dowel is used, the grooves themselves, or slots (10) aligned with them, extend to the outer wall of the outer body (2). The dowel can be used for fixing building materials, such as woven textile or fibre-glass materials, to outside walls, interior walls or ceilings.

11 Claims, 2 Drawing Sheets

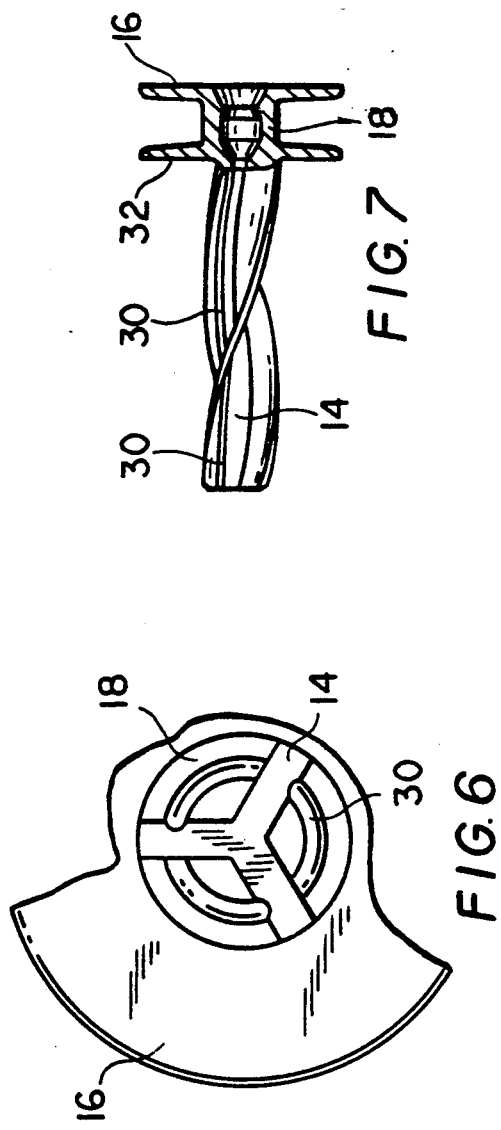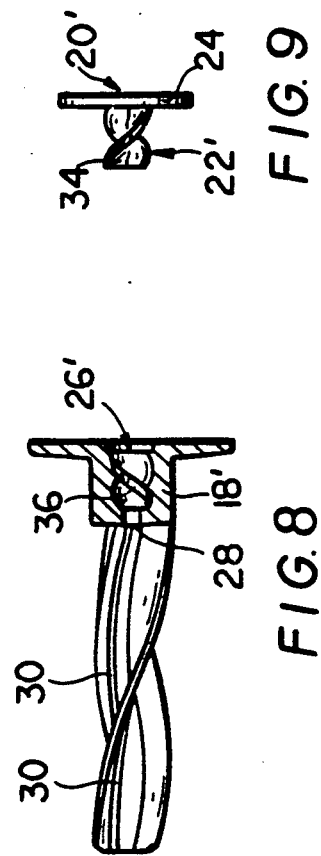

MULTIPART DOWEL

BACKGROUND OF THE INVENTION

Field of the Invention

The invention concerns a multipart dowel. One particularly suitable field of application is for fixing building materials, e.g. fabric made from textile material or fiberglass, to walls or ceilings. The dowel is designed to enable such flat materials to be evenly laid. In other words, having been driven in, the dowel is designed to enable the wall covering to be adjusted transversely to the plane of a wall or ceiling.

SUMMARY OF THE INVENTION

A multipart dowel constructed in accordance with this invention comprises a sleeve with an approximately cylindrical shaft, a core, and thread means for coupling the core to the sleeve. The thread means includes helical grooves famed in the shaft in a stellate engagement forming the female part of the thread and matching helical ribs on the core for the male thread. The thread means has a lead greater than the length of the thread means. The sleeve has a front part, said front section disposed in core made a well hole, said grooves terminating at said front part with slots extending to the outer wall of the sleeve. Ventilation means are provided through the dowel.

In use, the sleeve of the dowel is inserted into a hole drilled in the wall or ceiling. The core is then driven in with a hammer or drill hammer, its helical ribs engaging the helical grooves of the sleeve. Whilst being driven in, the core advances a partial, e.g. a half, revolution against the sleeve. The front part of the sleeve expands whilst the core is being driven in, in the same way as an expansion dowel, thus firmly fixing the dowel within the drill holes.

Preferably, at least on, and normally all the ribs of the core are each provided with an air vent groove extending over their full length, these grooves being open to the outside, thus providing ventilation for the wall or ceiling.

The thread means may be formed of differing numbers of ribs or grooves. Preferably, there should be three matching ribs and grooves in a mutual stellate arrangement.

If the sleeve and core each have a disc type head, the materials mentioned above can be placed between both. The core can be adjusted relative to the sleeve by a screwing action, and this can be facilitated by the head of the core being formed as a screw head. In addition to its head, the core can be formed with a spacer plate spaced axially from the head, enabling the materials to be suspended in between the spacer plate and the head.

Wire netting cannot be stretched out sufficiently widely by force to be hung over a disc type head without causing damage. Fitting this material can be made possible by the addition of a fastener, designed to be anchored to the core by means of a projection into a channel in the dowel core open to the outside. The wire netting can then be laid on the disc type head of the core, and the projection of the fastener stuck through the netting and finally anchored into the outer end of the core.

For this purpose the fastener can be press-stud type system, or by forming the projection of the fastener and the inside of the channel as matching second thread, the leads of which may also be greater than their length, so that the projection needs, for example, only half a turn before it is completely driven in.

In order to provide ventilation for the wall when a fastener is used, an air hole can be provided in the bottom of the channel, and another ventilation path leading outwards can also be provided between the channel and the projection of the fastener.

BRIEF DESCRIPTION OF THE DRAWINGS

FIG. 6 is a partial end view along line VI—VI in FIG. 2, considerably enlarged.

FIG. 7 shows a side view an alternate embodiment of the core with a spacer plate.

FIG. 8 is a side view of another embodiment of the core, partially in cross-section, with a female threaded channel.

FIG. 9 shows a side view of a matching fastener for the core of FIG. 8 with a male threaded screw projection.

DETAILED DESCRIPTION OF THE INVENTION

Figure 1:
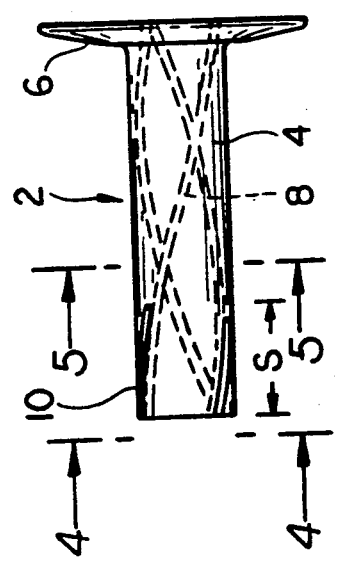
FIG. 1 shows in side view the sleeve of a multipart dowel in accordance with the invention.

The sleeve 2 of the dowel illustrated in FIG. 1 has an approximately cylindrical shaft 4 preferably having a disc shaped head 6. The sleeve is made of solid metal or plastic. It has three helical inner grooves 8 in a stellate arrangement inside it (see also FIGS. 4 and 5). These grooves are radially arranged and advance half a revolution over the complete length of the sleeve 2. In other words, the grooves form a female thread with a lead equal to twice the length of the sleeve.

The left or inner portion of shaft 4 is provided over a lengths with slots 10 extending to the end of the shaft, forming continuations of the helical grooves 8 and enabling the inside end (on the left in FIG. 1) of the sleeve to spread when the core is being driven in.

Figure 5:
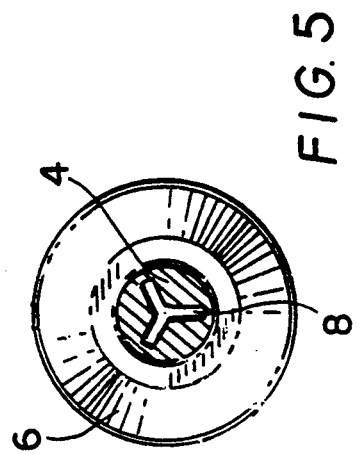
FIG. 5 is a cross-section along line V—V in FIG. 1
Figure 4:
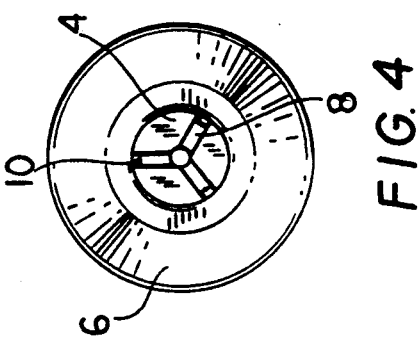
FIG. 4 is a frontal view along lines IV—IV in FIG. 1.

While FIG. 4 shows an external view of helical grooves 8, FIG. 5 shows their position at line V—V in FIG. 1, i.e. turned by approximately 60° from their position in FIG. 4.

Figure 2:
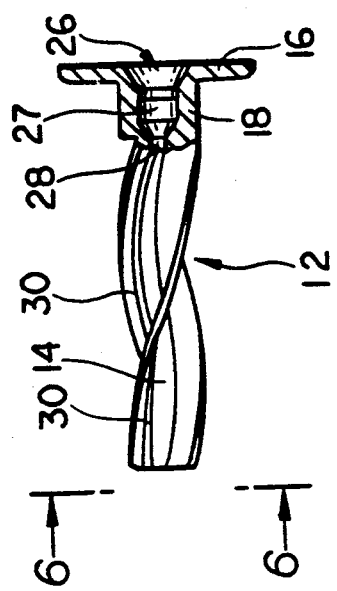
FIG. 2 shows a side view, with part in cross-section, of the matching core.

FIG. 2 shows the core 12 of the dowel. The core has three helical ribs 14 arranged radially, in a stellate arrangement relative to each other. Core 12 also has a disc type head 16, which (not shown here) may have a slot for application of a screwdriver or for connection of a drill hammer. The core is made of plastic. The core can be provided with a cylindrical shank as shown in FIGS. 2, 7 and 8. Alternatively, the disc type head 16 could be connected directly to the helical ribs 14.

Figure 3:
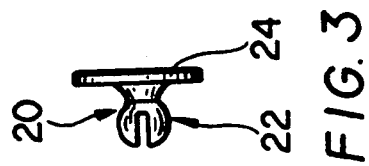
FIG. 3 shows a side view of a matching fastener.

If a shank 18 is present, it can be used to receive a fastener 20, shown in FIG. 3. The fastener has a projection 22, and a disc type head 24. The head can be shaped like a press-stud into a widened section 27 of the channel 26 which leads coaxially into the shank 18 of the core. For fixing wire mesh mats the projection 22 is stuck through a hole in the mat and then pressed into the channel 26, in this manner the mat is held fast between heads 16 and 24.

An airhole 28 is provided in the bottom of the channel 26. A ventilation path leads from this airhole towards the outside, partly inside the projection 22 and partly between the neck of the latter and the wall of the channel 26. An inward ventilation path is formed by ventilation grooves 30 which run along all three helical ribs 14 as shown in FIGS. 2 and 6. Once the multi-part dowel described above is installed, there is an uninterrupted ventilation path from the front end (on the left in FIG. 1) of the sleeve 10 through slots 10 and grooves 28, continuing through the ventilation grooves 30 of the core, the airhole 28, through the channel 26 and along the fastener 20 (if present).

FIG. 7 shows that the core 12 can also have, in addition to its head 16 a spacer disc 32 axially spaced therefrom. Mats or wide-meshed cloth can be suspended between spacer disc and head 16, as can narrow-meshed cloth, provided the mesh of the latter can be suitably widened.

FIGS. 8 and 9 show an alternate embodiment in which the fastener 20' has a projection 22' in the form of a double ribbed screw. This screw also has a lead which is greater than the length of the projection 22'. The fasten 20' advances only half a revolution over its complete length. The shank 18' of the core accordingly has a matching inner thread in the form of helical grooves 36. The fastener 20' can simply be knocked into the core shank 18' after its projection 22' has been passed through a hole in the fabric, or screwed in if a screw slot or similar device is provided, also using a drill hammer.

I claim:

1. A multipart dowel comprising:
a sleeve (2) having an approximately cylindrical body including inner threads in the form of a plurality of helical grooves (8) in a stellate engagement to form a female threaded member, and a front section (S); and
a core (12) having a plurality of outwardly projecting helical ribs (14) in stellate arrangement matching said helical grooves and forming a male thread member, said female and male member cooperating to form a multiplex thread for engaging said core and said sleeve;
said male and female threaded members having a lead and a length greater than said lead;
said front section having an external wall and axial slots (10) extending to said outer wall and aligned with said grooves (8) to allow said sleeve (2) to expand radially at said front section when said core (12) is inserted in said sleeve (2);
at least one of said helical ribs (14) having a ventilation groove (30) running along the entire length of said one rib and connected to an outer end of said core to enable ventilation through said dowel.

2. A dowel in accordance with claim 1 characterised by the fact that the thread has three ribs (14) and grooves (8) in stellate arrangement.

3. A dowel in accordance with claim 1, characterized by the fact that the sleeve (2) and core (12) each have a disc type head (6, 16).

4. A dowel in accordance with claim 3 characterised by the fact that the head 116) of the core 112) is in the form of a screw head.

5. A dowel in accordance with claim 3, characterised by the fact that the core has a distance disc (32) further in axial distance from its disc type head.

6. A dowel in accordance with claim 1 further comprising:
a fastener (20, 20') for the attachment of objects, including flat materials, on an outer end of said core (12); and
wherein said sleeve (2) is formed with a head (16) and a shank (18) extending between said head (16) and said ribs (8) with a channel (26) open to the outside;
said fastener (20, 20') having a projection (22, 22') for anchoring said fastener in said channel and a plate-like head (24).

7. A dowel in accordance with claim 6, characterised by the fact that the projection (22) and channel (26) are formed like a press-stud.

8. A dowel in accordance with claim 7, characterised by the fact that the projection (22') and channel (26') are formed as male and female fastener threads respectively.

9. A dowel in accordance with claim 8, characterised by the fact that the leads of the threads of projection (22') and channel (26') are greater than their length.

10. A dowel in accordance with claim 8, characterised by the fact that it is double-threaded and has two ribs (34) and grooves (36) in radial alignment with each other.

11. A dowel in accordance with claim 6, characterised by the fact that a bottom of the channel (26, 26') is connected through an airhole (28) with ventilation groove or grooves (30) and that there is a ventilation path leading to the outside between the inner wall of the channel (26, 26') and the projection (22, 22') of the fastener (20, 20').

* * * * *